Nov. 3, 1942.  D. S. WOLCOTT  2,300,850
METHOD OF MAKING WELDED CLAD TUBING
Filed June 13, 1939
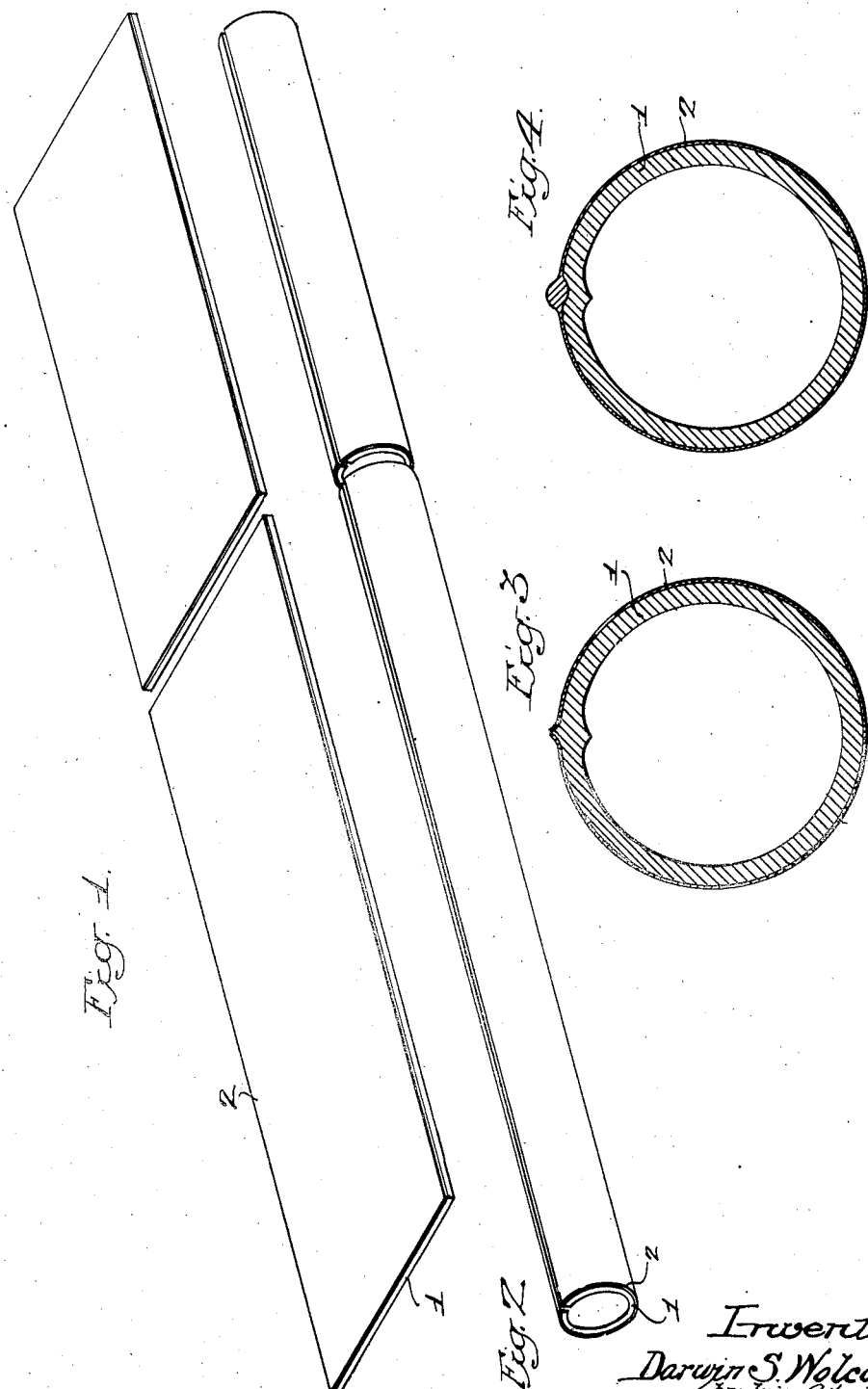

Patented Nov. 3, 1942

2,300,850

UNITED STATES PATENT OFFICE 2,300,850

METHOD OF MAKING WELDED CLAD TUBING

Darwin S. Wolcott, Colonial Village, Pa., assignor to Lukens Steel Company, Coatesville, Pa., a corporation of Pennsylvania Application June 13, 1939, Serial No. 278,985

2 Claims. (Cl. 29—188)

The principal object of this invention is to provide a highly economical method of manufacturing corrosion-resistant tubing.

Heretofore, it has been customary to manufacture tubing of this class from solid nickel, and while this tubing is highly efficient for the purposes for which it is primarily designed, it has the great disadvantage of being highly expensive. It has also been proposed to manufacture tubing of this class by a process involving the insertion of one of two separately formed tubes within the other, one of said tubes having a relatively thin wall and being composed of nickel, and the other being of common steel and having relatively thick walls to confer the necessary body strength. Tubes of this latter type, while effecting an economy in materials over the tubes composed entirely of nickel, are still relatively expensive by reason of the complicated process of manufacture, and they further lack the desirable close attachment or union between the two metals of which the composite tube is formed.

The production of tubing formed entirely of either pure or alloyed metal has been economically carried out either by resistance or flash welding, an apparatus and method for producing such tubing by resistance welding being illustrated in Patent No. 1,388,434, granted August 23, 1921, to G. B. Johnson. Those familiar with these welding methods and the conditions which it is necessary to establish to obtain a satisfactory weld, when approached by the applicant, advised that such methods could not be employed in the production of a clad tubing due to the fact that the cladding and the base metal have different electrical properties, specific heats, coefficients of expansion, melting points, and other physical constants. It was considered that these differences would prevent the formation of a satisfactory weld, or would result in a destruction of the cladding at and adjacent the weld. In flash welding, the difficulties of producing a satisfactory weld are particularly exaggerated where the heavy current produces very high temperatures and the abutting edges are brought to the molten state prior to the application of high pressure. This pressure produces a squeezing or upset at one or both faces of the weld.

I have discovered that tubes of the stated class, having all the advantages as to economy of materials of the composite tube described above, may be manufactured to considerable advantage by the novel welding method hereinafter set forth, and that tubes thus formed have in addition certain structural advantages which give them definite superiority over the aforementioned tubes of the prior art.

The manner in which a tube may be produced in accordance with my invention is illustrated in the attached drawing, wherein:

Figure 1 is a view of a composite blank from which the tube is formed;

Figure 2 shows the blank shaped to the tubular form but with the longitudinal edges of the blank unjoined;

Figure 3 is a transverse sectional view of the tube after the joint between the longitudinal meeting edges has been completed by means hereinafter described; and Figure 4 is a transverse sectional view of the completed tube.

In proceeding in accordance with my invention, I first produce a composite blank of the general form shown in Fig. 1 of the drawing, said blank consisting of a relatively heavy strip 1 of common steel, to one side of which a relatively thin sheet 2 of nickel has been firmly adhered. While within the scope of the invention the nickel sheet 2 may be adhered to the body strip 1 by other means, I prefer to employ a "cladding" process, wherein union between the nickel and steel component elements is established by rolling out a composite billet to the desired sheet thickness. The total thickness of the composite blank and the relative thicknesses of the steel and nickel components are unimportant, and may vary as required, as also may the over-all length of the blank. In width, however, the blank is slightly larger than the circumference of the tube into which it is to be formed.

The composite blank formed as described above is now shaped into tubular form, as shown in Fig. 2, and immediately following this shaping operation, or subsequently as a separate operation, the longitudinal meeting edges of the tubular blank are brought to welding temperature, and are then forced together so as to produce an efficient welded joint. In the nickel-clad tube thus produced, the inner heavy steel portion is embraced by a relatively thin protective facing of pure nickel.

Where the welding operation is carried out with the use of ordinary welding joints such as commonly employed in resistance or flash welding, and illustrated in Figs. 5 to 7, the pressing together of the heated edges of the blank in this welding operation causes a spreading of the metal at the joint in the radial direction, as illustrated in Fig. 3, and this upsetting of the metal at the joint has a tendency to slightly separate the edges of the nickel facing, leaving the latter discontinuous. In order to seal the facing and to preclude any possibility of discontinuity, I now subject the joint to a further welding operation wherein fused nickel is deposited to form a seam extending continuously the full length of the joint. This deposition of metal effected under welding conditions fuses the cladding metal within the seam area and produces a seam of the character illustrated in Fig. 4, wherein, preferably, the nickel weld metal penetrates the wall of the tube at least to the normal depth of the facing. Subsequently, the surface protrusion formed by the deposited metal may be ground or otherwise trimmed to the true cylindrical surface of the tube, although for the purposes for which tubes of this character are ordinarily employed, no such accuracy of cylindrical form is required.

A nickel-clad tube made as described above has several material advantages over the aforesaid tubes of the prior art. It is considerably less expensive, for example, than the tubes of solid nickel, and for all practical purposes is equally efficient both in resistance to corrosion and as to strength and durability. It is superior to the prior composite tubes both structurally and in its relative simplicity and cheapness of manufacture. As regards structural superiority, this factor resides primarily in the characteristics of the composite blank from which the tube is formed and in the intimate union of the steel and nickel existing in the blank and in the finished tube. This union is continuous and uniform over the entire meeting surfaces of the steel base and the cladding nickel sheet. I have found that this intimate union between the component metals is undisturbed by bending the blank even to small radius and persists in the finished tube under all conditions of normal use. This characteristic is of particular importance when the tube is used under conditions requiring transfer of heat through the tube wall.

The foregoing description has been confined to the method of producing the nickel-clad tube, and to the characteristics of the tube, with which the invention is primarily concerned. It will be apparent, however, that without departure from the invention or from the essential procedure outlined, the method may be employed either to produce a tube in which the nickel component forms an interior lining, or one in which both the interior and exterior of the tube exhibit the nickel surface. In each case the desirable physical characteristics of the tube and the advantages of the process of manufacture are maintained. In its broader aspects, also, the invention is not limited to the use of nickel as the cladding or lining metal, and extends to other corrosion-resisting metals or alloys, such, for example, as stainless steel. It is desired, further, that the invention be not limited to the previously described preferred method of uniting the corrosion-resistant sheet to the base metal, as the said sheet, particularly in the case of stainless steel, may be satisfactorily adhered to the base by other means, such, for example, as resistance welding.

Since the method hereinbefore set forth may, obviously, be considerably modified without departing from the spirit of my invention, I do not wish to be understood as limiting myself thereto except as hereinafter claimed.

I claim:

1. The method of producing corrosion-resistant tubing which consists in integrally uniting sheets of steel and corrosion-resisting material to form a laminated strip having a width somewhat in excess of the circumference of the required tube, shaping the strip to the form of a tubular blank with the cladding material exteriorly disposed, heating the edges of the tubular blank to welding temperature and forcing said edges together to produce a complete weld of the body sheet causing extrusion of the steel through the cladding material at the joint, removing the extruded steel at the clad faces of the tube to a depth at least as great as the thickness of the cladding and depositing fused metal identical with the cladding along the joint.

2. The method of producing corrosion-resistant tubing which consists in integrally uniting sheets of steel and corrosion-resisting material to form a laminated strip having a width somewhat in excess of the circumference of the required tube, shaping the strip to the form of a tubular blank with the cladding material exteriorly disposed, heating the edges of the tubular blank to welding temperature and forcing said edges together to produce a complete weld of the body sheet causing extrusion of the steel through the cladding material at the joint, removing the extruded steel at the clad faces of the tube to a depth at least as great as the thickness of the cladding and depositing fused metal identical with the cladding along the joint and simultaneously fusing the metal of the tube in the joint area to permit penetration of the deposited metal at least to the depth of the cladding.

DARWIN S. WOLCOTT.